United States Patent [19]
Simpson

[11] Patent Number: 6,038,990
[45] Date of Patent: Mar. 21, 2000

[54] SEEDER AND LIQUID APPLICATOR

[75] Inventor: Virgil Simpson, Ransom, Kans.

[73] Assignee: Simpson Farm Enterprises, Inc., Ransom, Kans.

[21] Appl. No.: 09/324,259

[22] Filed: Jun. 2, 1999

[51] Int. Cl.[7] .............................. A01C 5/06; A01C 23/02
[52] U.S. Cl. ........................................... 111/124; 111/175
[58] Field of Search ..................................... 111/175, 124, 111/118, 119, 120, 127

[56] References Cited

U.S. PATENT DOCUMENTS

| | | | |
|---|---|---|---|
| 3,895,589 | 7/1975 | Garner et al. | 111/124 X |
| 5,333,559 | 8/1994 | Hodapp et al. | 111/175 X |

Primary Examiner—Christopher J. Novosad
Attorney, Agent, or Firm—Litman, Kraai & Brown L.L.C.; Mark E. Brown

[57] ABSTRACT

A seeder and liquid applicator is adapted for mounting on a sweep-type spreader for use in agricultural seeding and fertilizing operations. The spreader includes a shank for mounting it on an implement. A T-head support is bolted to the spreader shank. The T-head support mounts a T-head which is connected to a seed hose. The seed hose is also connected to a seed source on the implement. A liquid tube is connected to a discharge novel mounted on the liquid tube. The feed hose and the liquid tube are secured to the T-head support and to each other. Seeds are discharged horizontally and laterally from the T-head and liquid fertilizer is discharged rearwardly in line with the direction of travel of the spreader.

15 Claims, 5 Drawing Sheets

SEEDER AND LIQUID APPLICATOR

BACKGROUND OF THE INVENTION

1. Field of the Invention

The present invention relates generally to agricultural implements, and in particular to a seeder and liquid applicator for a planter.

2. Description of the Prior Art

In commercial farming operations row crops are commonly planted with multi-row implements which are pulled through fields. A common procedure for agricultural seeding involves opening the field to prepare a suitable seed bed, applying seed and fertilizer to the seed bed, and closing the earth back over the seed bed. The particular tools employed in planting operations depend on such factors as field conditions and the crops being planted. For example, disk and knife openers minimize soil disturbance. Sweep-type openers or spreaders, on the other hand, have laterally-extending blades for both preparing a seed bed and controlling weeds by severing same simultaneously with seeding and fertilizing the seed bed. Sweep-type spreaders can be combined with seed sources and liquid fertilizer sources to accomplish seeding, fertilizing and weeding in single passes.

The present invention addresses problems associated with accurately placing the seed and fertilizer behind a spread opener. Heretofore, there has not been available a seeder and liquid applicator for a sweep spreader with the advantages and features of the present invention.

SUMMARY OF THE INVENTION

In the practice of the present invention, a seeder and liquid applicator is provided for a spreader which includes a sweep mounted on a shank. The spreader and liquid applicator includes a T-head support bolted to the spreader shank and mounting a T-head. A seed hose extends from a seed source on the implement to the T-head for dispensing seeds laterally on the seed bed. A liquid tube is fastened to the T-head support and to the seed tube and extends from a liquid fertilizer source on the implement to a discharge nozzle. The discharge nozzle discharges liquid fertilizer in the seed bed in line with a direction of travel of the spreader.

OBJECTS AND ADVANTAGES OF THE INVENTION

The principals objects and advantages of the present invention include: providing a seeder and liquid applicator; providing such a seeder and liquid applicator which is adapted for use with sweep-type spreaders; providing such a seeder and applicator which accurately and reliably dispenses seed and liquid; providing such a seeder and liquid applicator which disperses seed transversely and applies fertilizer in-line; providing such a seeder and liquid applicator which is relatively easy to mount on existing openers; providing such a seeder and liquid applicator which is relatively well-protected from damage in operation; providing such a seeder and liquid applicator which closely follows a sweep-type opener; and providing such a seeder and liquid applicator which is efficient in operation, capable of a long operating life, and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

I. Introduction and Environment

Figure 1:
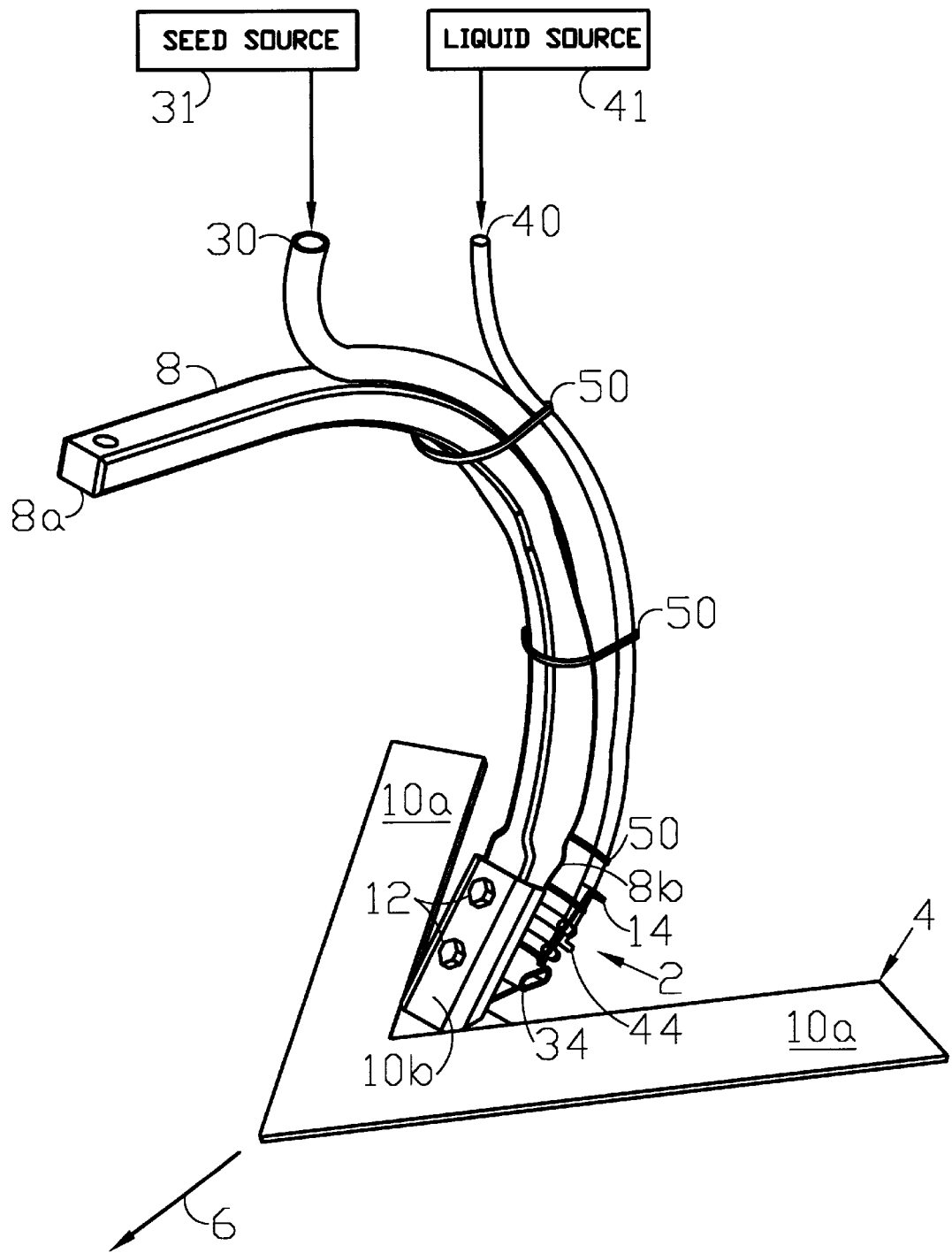
FIG. 1 is an upper, front, left-side, perspective view of a seeder and liquid applicator embodying the present invention, shown mounted on a sweep-type spreader.
Figure 2:
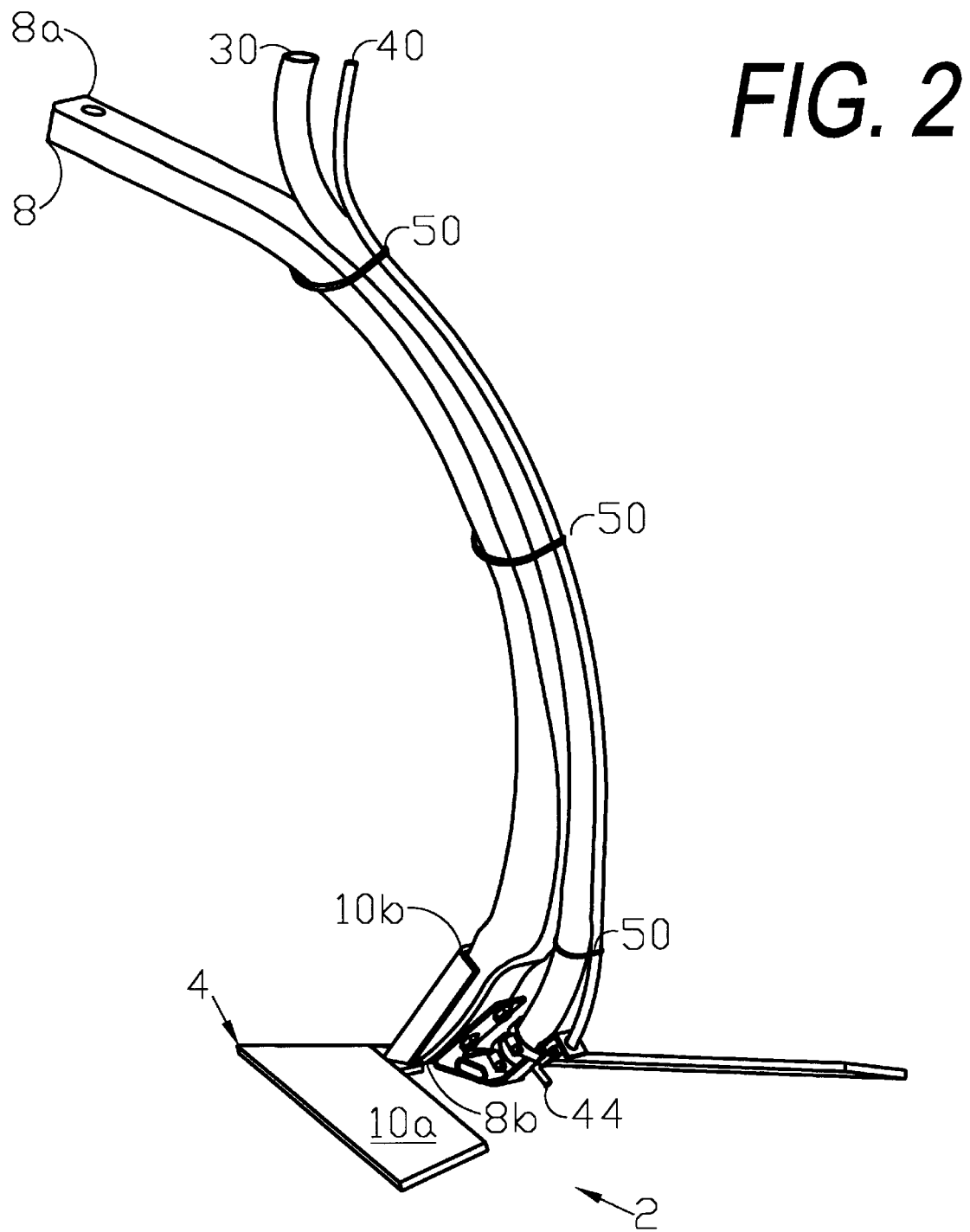
FIG. 2 is an upper, rear, left-side, perspective view thereof.
Figure 3:
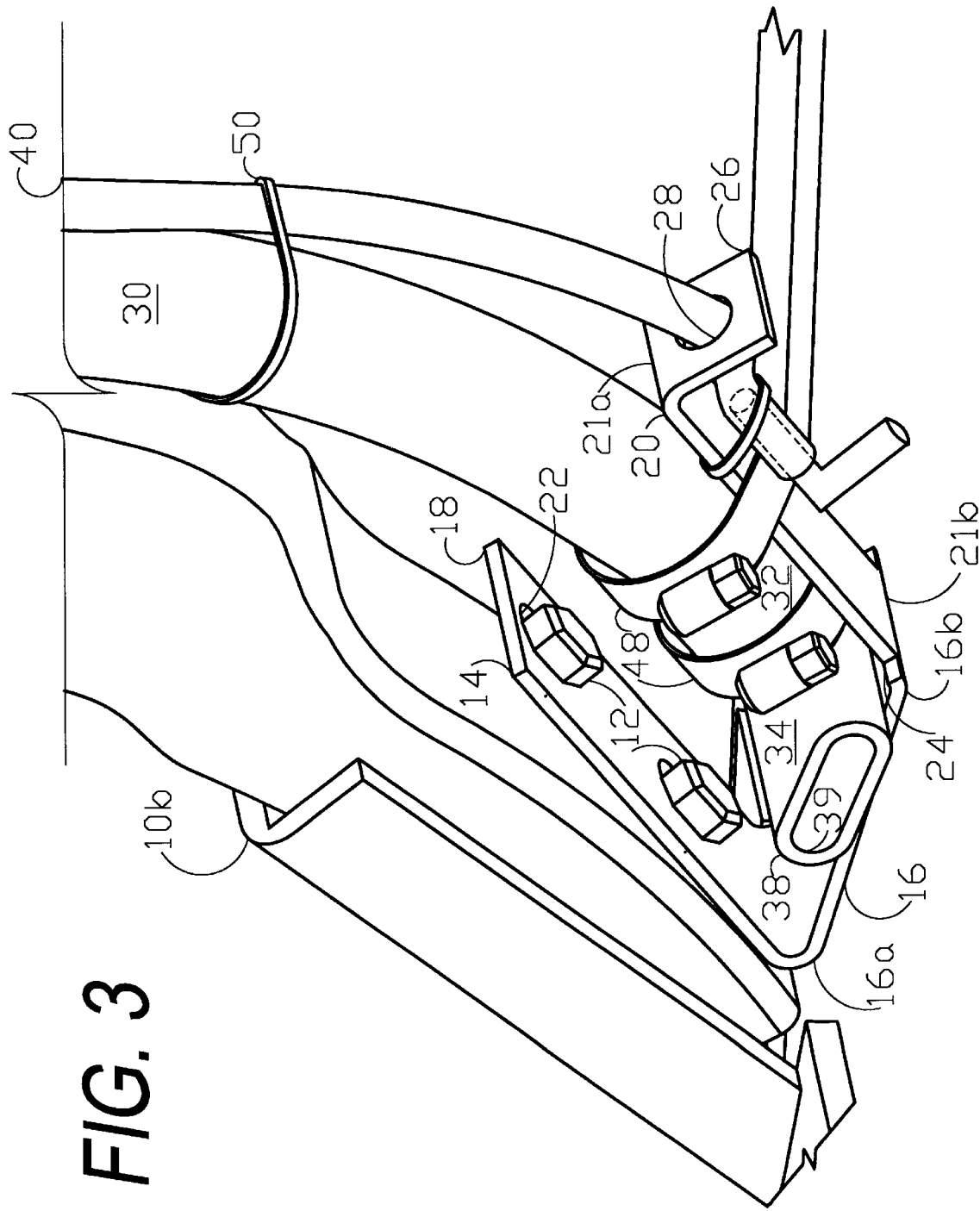
FIG. 3 is an enlarged, fragmentary, upper, rear, left-side, perspective view thereof.
Figure 4:
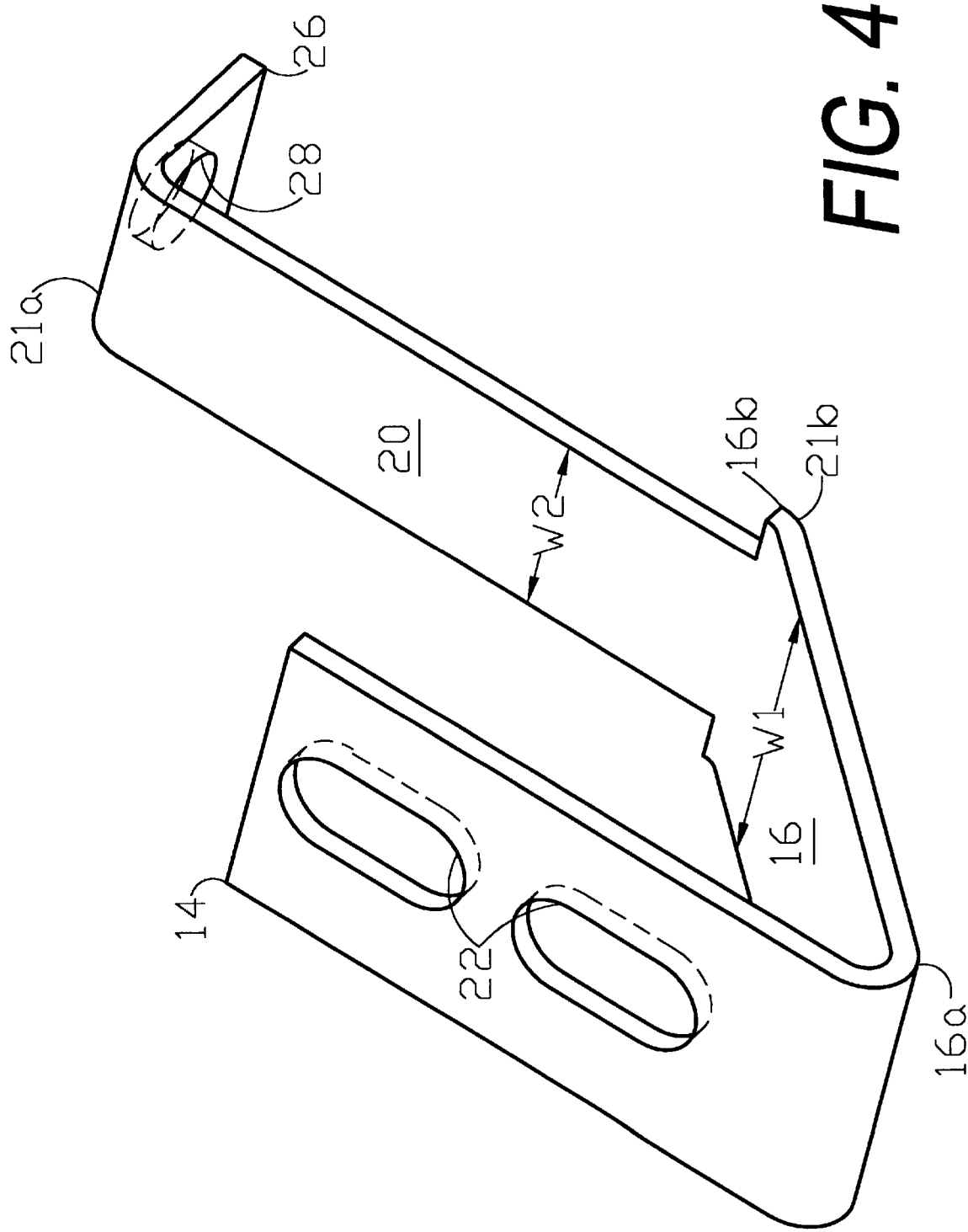
FIG. 4 is an upper, front, left-side, perspective view of a T-head support thereof.
Figure 5:
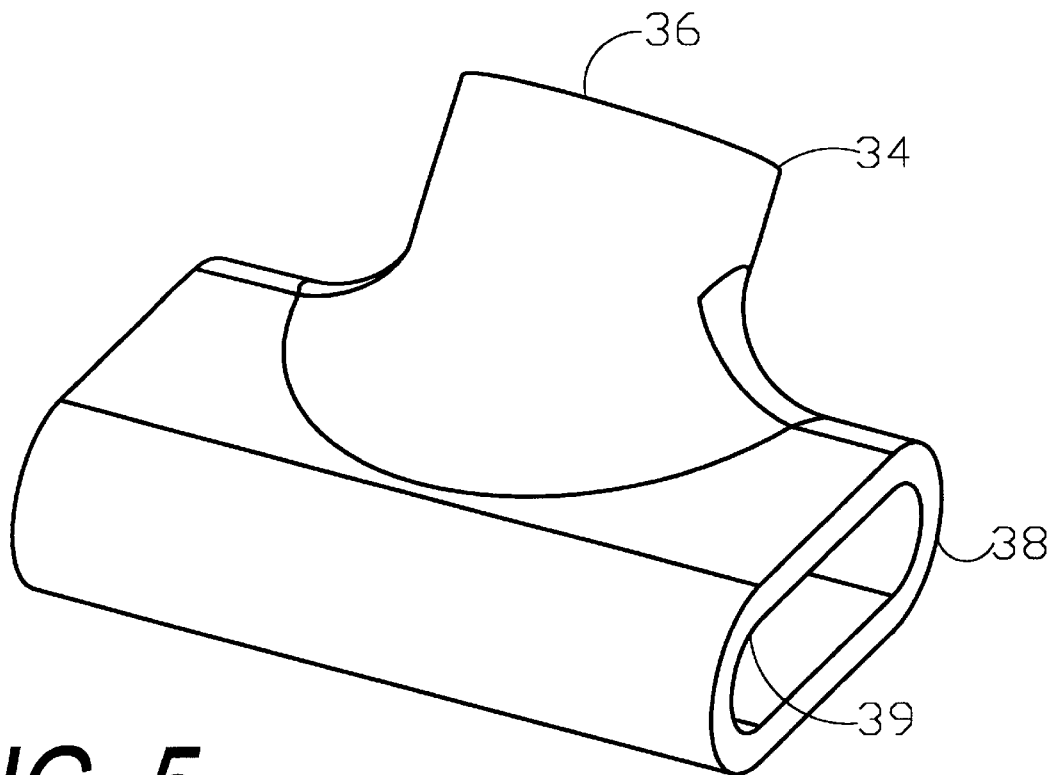
FIG. 5 is an upper, front, left-side, perspective view of a T-head thereof.
Figure 6:
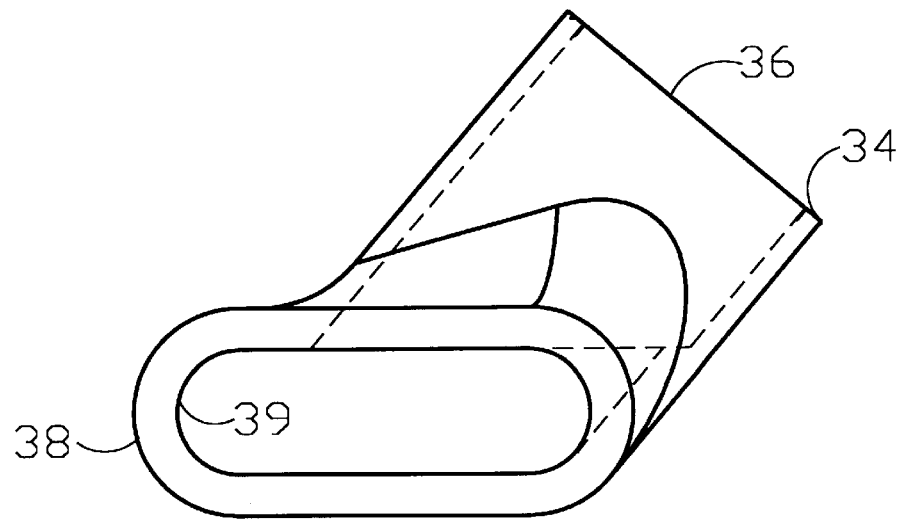
FIG. 6 is a left-side elevational view of the T-head.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a seeder and liquid applicator embodying the present invention and mounted on a spreader 4. A suitable number of spreaders 4 are mounted at spaced locations on an agricultural implement (not shown). In operation, the agricultural implement is pulled through a field being planted along a direction of travel 6.

The spreader 4 includes a shank 8 with an upper end 8a adapted for mounting on a toolbar of the implement and a lower end 8b mounting a sweep 10 with a pair of blades 10a and a center post 10b. The sweep 10 is mounted on the shank 8 by suitable sweep mounting bolts 12 extending through the shank lower end 8b and the sweep center post 10b.

Seeder and Liquid Applicator 2

The seeder and liquid applicator 2 includes a T-head support 14 with a base 16 and front and back flanges 18 and 20 extending upwardly and rearwardly (with respect to the direction of travel 6) from base front and back ends 16a,b respectively. The front and rear flanges 18, 20 form angles approximately 45° and 135° with the base 16, but other suitable angular relationships could be employed. The front flange 18 includes a pair of elongated receivers 22 which receive the sweep mounting bolts 12 and permit vertical adjustment of the position of the T-head support 14.

The back flange 20 includes an upper end 21a from which a back flange extension 26 extends rearwardly and downwardly. The extension 26 includes a liquid tube receiver 28. The back flange 20 also includes a reduced width W2 as compared to a width W1 of the base 16 whereby a pair of shoulders 24 are formed in proximity to the juncture of the base 16 and the back flange 20 in proximity to a lower end 21b of the back flange 20.

A seed hose 30 communicates at its upper end with a seed source 31, such as a seed hopper and dispenser mounted on the implement. The seed hose 30 includes a lower end 32 which mounts a T-head 34 with an upper, inlet port 36 coupled to the seed hose lower end 32 and a pair of outlet ports 38. The outlet ports 38 extend horizontally and transversely and include mouths 39 with longitudinal axes which are generally parallel to the direction of travel 6. The inlet port 36 has a generally circular configuration and the outlet ports 38 are horizontally elongated with generally elliptical or oval configurations.

A liquid tube 40 communicates with a liquid (e.g. fertilizer, nutrient, etc.) source 41 mounted on the implement. The liquid tube 40 terminates at a lower end 42 mounting a discharge nozzle 44 comprising an elbow with a proximate leg 46a received in the liquid tube lower end 42 and a distal leg 46b extending downwardly and rearwardly (with respect to the direction of travel 6) from the back flange 20. The liquid tube 40 extends through the extension receiver 28. The liquid tube 40 is secured to the support back flange 20 and to the seed hose 30 by tie wraps 50 which can be positioned at appropriate, spaced intervals.

The seed hose 30, the T-head 34, the liquid tube 40, and the discharge nozzle 44 can be mounted on the support 14 and the shank 8 by any suitable means. For example, a pair of hose clamps 48 encircle the seed hose 30, the T-head inlet port 36 and the back flange 20. The narrower width W2 of the back flange 20, as compared to the base width W1, facilitates centering the seed hose 30. The greater width W1 of the support base 16 provides protection for the T-head 34 as the spreader 4 is pulled through a field below the surface thereof. The front flange 18 has the same width W1 as the base 16 whereby ample structural bracing is provided for the T-head support 14 via the mounting bolts 12.

III. Operation

In operation, the sweep 10 passes through a field slightly below its surface and opens a furrow at a predetermined depth. Seeds are dispensed from the feed source 31 and are dispersed from the T-head outlet ports 38 generally laterally and horizontally whereby the seeds are deposited generally behind respective sweep blades 10a. The seeds are thus almost instantly covered with earth. A stream of liquid, such as fertilizer, nutrients, etc., is discharged from the discharge nozzle 44 and generally permeates the soil behind the sweep 10 along the direction of travel 6. The combination of the transverse discharge of the seeds from the outlet ports 38 and the in-line discharge of the liquid from the discharge nozzle 44 achieves maximum protection for the seeds together with exposure to the beneficial effects of the liquid fertilizer or nutrients, thus increasing the germination rate and the crop yields for particular quantities of seeds planted.

It is to be understood that while certain forms of the present invention have been illustrated and described herein, it is not to be limited to the specific forms or arrangement of parts described and shown.

What is claimed and desired to be secured by letters patent is as follows:

1. A seeder and liquid applicator for a spreader mounted on a planter with a seed source, which seeder and liquid applicator comprises:
   a) a support connected to the spreader;
   b) a seed hose adapted for connection to the seed source and having a hose discharge end;
   c) a T-head including an inlet port connected to the hose discharge end and a pair of outlet ports oriented laterally;
   d) seeder mounting means for mounting one of said hose discharge end and said T-head on said support;
   e) a liquid tube adapted for connection to a liquid source on the implement and having a tube discharge end;
   f) a liquid discharge associated with said tube discharge end; and
   g) liquid tube mounting means for mounting said tube on said support.

2. The seeder and liquid applicator according to claim 1, which includes:
   a) said support including a base with front and back ends, a front flange extending upwardly from said base front end and mounted on said spreader shank, and a back flange extending upwardly from said base back end; and
   b) said back flange mounting said T-head and said liquid discharge.

3. The seeder and liquid applicator according to claim 2, which includes:
   a) said spreader including a shank with an upper end for mounting on the planter and a lower end;
   b) said support front flange including a pair of elongated receivers; and
   c) a pair of mounting bolts mounting said support on said shank and each received in a respective receiver.

4. The seeder and liquid applicator according to claim 2, which includes:
   a) said back flange including a lower end connected to the T-support base back end and an upper end;
   b) an extension extending rearwardly from said back flange upper end; and
   c) said extension including a liquid tube receiver receiving said liquid tube.

5. The seeder and liquid applicator according to claim 1, which includes:
   a) said seeder mounting means including an annular clamp encircling said support back flange and said seeder hose for securing said seeder hose on said support back flange.

6. The seeder and liquid applicator according to claim 2, which includes:
   a) said support base having a first width;
   b) said support back flange having a second width less than said support base first width; and
   c) a pair of shoulders formed in proximity to the intersection of said support base back end and said back flange lower end; said shoulders being formed by the reduced width of said back flange with respect to said support base.

7. In combination with a spreader having a shank with an upper end adapted for mounting on a planter and a lower end, said spreader further including a sweep with a pair of laterally extending blades and a center post mounted on the shank by a sweep mounting bolt, the planter including a seed source and a liquid source, the improvement of a seeder and liquid applicator, which comprises:
   a) a T-head support including:
      1) a base with front and back ends;
      2) a front flange connected to and extending upwardly and rearwardly from said base front end, said front flange having a receiver adapted for receiving said sweep mounting bolt; and
      3) a back flange connected to and extending upwardly and rearwardly from said base back end;
   b) a seed hose including an upper end adapted for connection to the seed source on the planter and a lower end;

c) a T-head including an upper, inlet port connected to said seed hose lower end and a pair of outlet ports oriented laterally in opposite directions with respect to each other;

d) a liquid tube including an upper end adapted for connection to the planter liquid source and a lower end;

e) a discharge nozzle connected to said liquid tube lower end and fluidically communicating with said liquid tube;

f) seeder mounting means mounting one of said seed hose and said T-head on said support; and g) liquid applicator mounting means mounting one of said liquid tube and said discharge nozzle on said support.

8. The seeder and liquid applicator according to claim 7, which includes:

a) said support front flange receiver comprising a first mounting bolt receiver;

b) said front flange having a second mounting bolt receiver adapted for receiving a second sweep mounting bolt; and c) said mounting bolt receivers being elongated whereby a vertical position of said seeder and liquid applicator can be adjusted with respect to said spreader.

9. The seeder and liquid applicator according to claim 7, which includes:

a) said support base having a first width;

b) said support back flange having a second width less than said first width; and c) a pair of shoulders located generally at the intersection of said base and said back flange, said shoulders being formed by the difference between said first and second widths.

10. The seeder and liquid applicator according to claim 7 wherein said T-head outlet ports have mouth with elongated configurations oriented generally horizontally with longitudinal axes extending generally parallel to a direction of travel of said spreader.

11. The seeder and liquid applicator according to claim 7, which includes:

a) said seeder mounting means comprising an annular clamp encircling said seed hose and said back flange.

12. The seeder and liquid applicator according to claim 7, which includes:

a) said liquid applicator mounting means comprising a tie encircling said liquid tube and said back flange.

13. The seeder and liquid applicator according to claim 7, which includes:

a) said support back flange having a lower end connected to said support base back end and an upper end; and b) an extension connected to said back flange upper end and extending rearwardly therefrom, said extension having a liquid tube receiver receiving said liquid tube.

14. The seeder and liquid applicator according to claim 7, which includes:

a) said discharge nozzle having a generally L-shaped configuration with a proximate leg received in said liquid tube lower end and a distal leg extending generally rearwardly and downwardly from said support back flange.

15. A seeder and liquid applicator for a spreader with a sweep mounted on a shank by a pair of sweep mounting bolts, the spreader being adapted for mounting on a planter with a seed source and a liquid source, which seeder and liquid applicator comprises:

a) a T-head support including:

1) a base with front and back ends;

2) a front flange connected to and extending upwardly and rearwardly from said base front end, said front flange having a pair of receivers each adapted for receiving a respective sweep mounting bolt and each said receiver having an elongated configuration whereby said seeder and liquid applicator is adjustably positioned on said spreader; and 3) a back flange with a lower end connected to said base back end and an upper end, said back flange extending upwardly and rearwardly from said base back end;

b) an extension connected to and extending downwardly and rearwardly from said back flange upper end, said extension have a liquid tube receiver; and c) said base having a first width and said back flange having a second width less than said first width; and d) a pair of shoulders located in proximity to the intersection of said base back end and said back flange, lower end said shoulders being formed by the greater width of said base with respect to said back flange;

e) a seed hose including an upper end adapted for connection to the seed source on the planter and a lower end;

f) a T-head including an upper, inlet port connected to said seed hose lower end and a pair of lower, outlet ports oriented laterally in opposite directions with respect to each other, said outlet ports having generally horizontal elongated configurations with longitudinal axes generally parallel to the spreader direction of travel;

g) a liquid tube including an upper end adapted for connection to the liquid source on the planter and a lower end;

h) an L-shaped discharge nozzle including a proximate leg received in said liquid tube lower end and a distal leg extending generally downwardly and rearwardly from said back flange;

i) an annular clamp encircling said seed hose and said support back flange;

j) a lower tie encircling said liquid tube and said support back flange;

k) an upper tie encircling said seed hose and said liquid tube; and l) an extension extending downwardly and rearwardly from said back flange upper end and including a liquid tube receiver receiving said liquid tube.

\* \* \* \* \*